(12) United States Patent
Hoferick

(10) Patent No.: US 11,576,406 B2
(45) Date of Patent: Feb. 14, 2023

(54) METHOD FOR THE INACTIVATION OF MICROORGANISMS IN FOODS

(71) Applicant: MESSER INDUSTRIEGASE GMBH, Bad Soden (DE)

(72) Inventor: Ratka Hoferick, Erndtebrück (DE)

(73) Assignee: Messer Industriegase GmbH, Bad Soden (DE)

( * ) Notice: Subject to any disclaimer, the term of this patent is extended or adjusted under 35 U.S.C. 154(b) by 0 days.

(21) Appl. No.: 16/771,357

(22) PCT Filed: Oct. 24, 2018

(86) PCT No.: PCT/EP2018/079102
§ 371 (c)(1),
(2) Date: Jun. 10, 2020

(87) PCT Pub. No.: WO2019/120693
PCT Pub. Date: Jun. 27, 2019

(65) Prior Publication Data
US 2020/0345042 A1 Nov. 5, 2020

(30) Foreign Application Priority Data
Dec. 19, 2017 (DE) .......................... 102017011752.7

(51) Int. Cl.
*A23L 2/40* (2006.01)
*A23L 3/00* (2006.01)
(Continued)

(52) U.S. Cl.
CPC ............. *A23L 3/0155* (2013.01); *A23L 2/42* (2013.01); *A23L 3/34095* (2013.01); *A23V 2002/00* (2013.01)

(58) Field of Classification Search
CPC ...... A23L 2/42; A23L 3/0155; A23L 3/34095; A23L 3/015; A23L 3/3409
See application file for complete search history.

(56) References Cited

U.S. PATENT DOCUMENTS 4,390,350 A * 6/1983 Palm .................... A23C 3/0375
422/26
5,393,547 A 2/1995 Balaban et al.
(Continued)

FOREIGN PATENT DOCUMENTS

CN 201352942 Y 12/2009
EP 0979657 B1 2/2006
(Continued)

OTHER PUBLICATIONS

International Search Report and Written Opinion issued in corresponding PCT Application No. PCT/EP2018/079102, dated Jan. 8, 2019.

*Primary Examiner* — Ericson M Lachica
(74) *Attorney, Agent, or Firm* — Andrus Intellectual Property Law, LLP

(57) ABSTRACT

In a method for the inactivation of microorganisms in liquid foods, a liquid food is mixed with a pressurized, liquefied gas at a pressure which is sufficient to maintain the liquefied gas in the liquid state. The mixture of food and gas is then depressurized to a pressure at which the liquefied gas is vaporized. According to the invention, before or during the depressurization to the second pressure, the mixture is guided through a pipeline and brought up to a flow speed in the pipeline which is sufficient to form cavitations in the liquid food.

19 Claims, 1 Drawing Sheet

(51) Int. Cl.
 *A23L 3/30* (2006.01)
 *A23L 3/015* (2006.01)
 *A23L 2/42* (2006.01)
 *A23L 3/3409* (2006.01)

(56) References Cited

U.S. PATENT DOCUMENTS

| | | | |
|---|---|---|---|
| 2003/0111429 A1* | 6/2003 | Montalvao | A23L 2/54 210/787 |
| 2004/0033296 A1 | 2/2004 | Yuan et al. | |
| 2004/0238975 A1* | 12/2004 | Sakakibara | A23L 2/54 261/100 |
| 2005/0266128 A1* | 12/2005 | Yuan | A23L 3/3463 426/321 |
| 2006/0210679 A1* | 9/2006 | Leonhardt | C12H 1/165 426/238 |
| 2007/0154614 A1* | 7/2007 | Sherwood | A23L 3/3409 426/583 |
| 2008/0003334 A1* | 1/2008 | Bell | A23L 3/3418 426/236 |
| 2008/0164199 A1* | 7/2008 | Seneviratne | C02F 1/34 210/252 |
| 2009/0068313 A1* | 3/2009 | Murota | A23F 5/243 426/67 |
| 2009/0130278 A1* | 5/2009 | Murota | A23F 3/163 426/474 |
| 2010/0104705 A1* | 4/2010 | Gordon | A23L 2/50 426/238 |
| 2011/0303532 A1* | 12/2011 | Foret | B01J 19/088 204/269 |
| 2012/0135109 A1* | 5/2012 | Paeschke | A23L 19/07 426/50 |
| 2012/0256329 A1* | 10/2012 | Katayama | A23L 27/60 261/36.1 |
| 2013/0122159 A1* | 5/2013 | Duarte Vieira | A23C 3/00 99/485 |
| 2017/0079478 A1* | 3/2017 | Kirsch | B65D 83/60 |
| 2017/0238584 A1* | 8/2017 | Kellerman | A23L 3/3508 |
| 2017/0258116 A1* | 9/2017 | Niesmiejanow | A23C 3/04 |
| 2017/0265500 A1 | 9/2017 | Duarte Vieira | |
| 2018/0049456 A1* | 2/2018 | Gehin-Delval | A23L 35/10 |
| 2018/0134583 A1* | 5/2018 | Bauer | A23L 3/28 |
| 2019/0069581 A1* | 3/2019 | Feilner | B67C 3/225 |

FOREIGN PATENT DOCUMENTS

| | | |
|---|---|---|
| WO | WO 2004026452 A1 | 4/2004 |
| WO | WO 2017124106 A1 | 7/2017 |

* cited by examiner

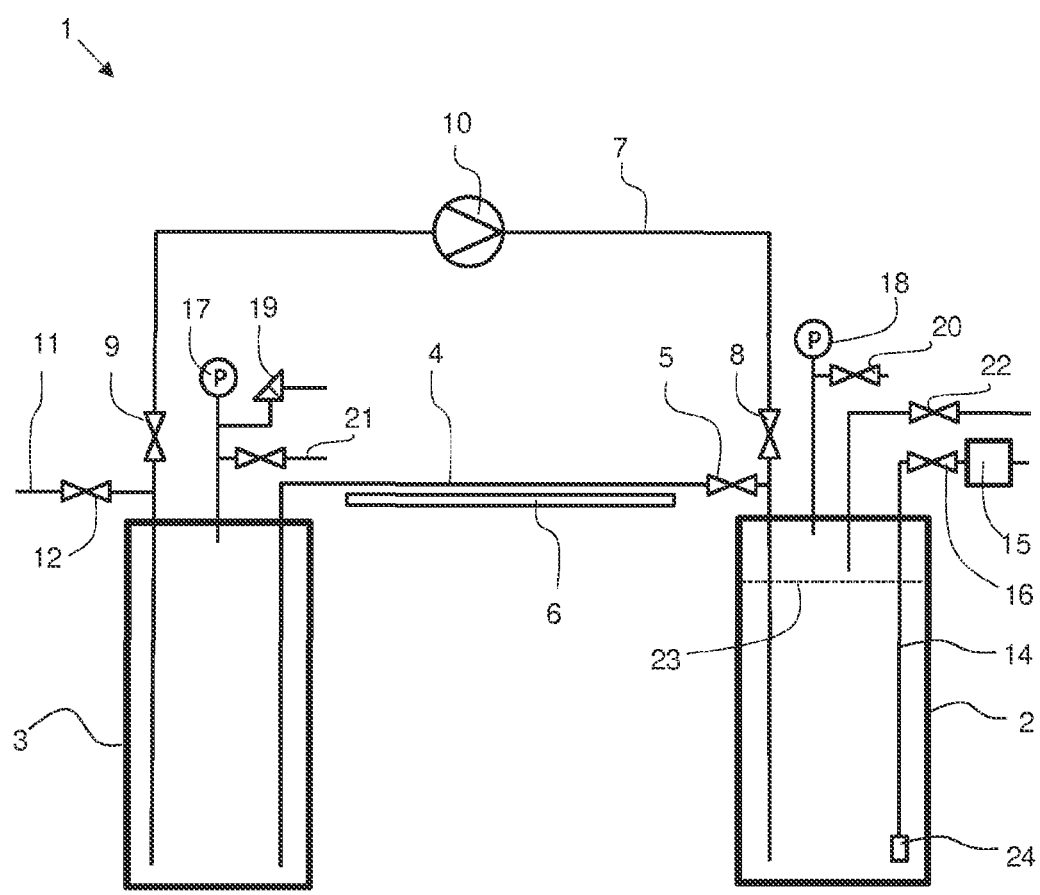

METHOD FOR THE INACTIVATION OF MICROORGANISMS IN FOODS

CROSS-REFERENCE TO RELATED APPLICATIONS

This application is the U.S. national stage application of International Application PCT/EP2018/079102, filed Oct. 24, 2018, which International Application was published on Jun. 27, 2019, as International Publication WO 2019/120693 in the German language. The International Application claims priority to German Application No. 102017011752.7, filed Dec. 19, 2017. The International Application and German Application are hereby incorporated herein by reference, in their entireties.

FIELD

The invention relates to a method for the inactivation of microorganisms in foodstuffs in which a liquid foodstuff is brought into contact with and at least partially mixed with a gas and the resulting mixture is subsequently expanded from a first pressure value to a second pressure value. The invention furthermore relates to a corresponding apparatus.

BACKGROUND

The sterilization of foodstuffs, especially liquid foodstuffs such as fruit or vegetable juices, is usually effected by heat treatment at temperatures of over 60° C., ultrafiltration or by chemical processes such as for example the cold sterilization process. The processes of heat treatment and ultrafiltration have the disadvantage that valuable contents are in the process simultaneously removed from the product or destroyed. Cold sterilization is predominantly carried out using chemicals the safety of which in terms of health has not been proven in all cases and which moreover can result in alterations to the sensory properties of the product.

WO 2004/026452 A1 proposes exposing a liquid to ultrasonic waves. The resulting cavitations lead to cell disruption of the microorganisms present in the liquid.

As an alternative to the aforementioned methods, physicochemical processes for sterilization using carbon dioxide have already been proposed. For example, U.S. Pat. No. 5,393,547 A1 describes a process in which a foodstuff to be sterilized, especially a liquid foodstuff such as fruit juice, is mixed with liquid or supercritical $CO_2$. After a given exposure time of for example 1-60 min has elapsed, carbon dioxide and foodstuff are separated from each other. The sterilization effect is predominantly based on the diffusion of carbon dioxide into the cells at a low pH. On subsequent expansion of the mixture, carbon dioxide diffuses back out of the cell and extracts vital components therefrom. Repeating this process a number of times destroys the cell walls of the microorganisms and thus inactivates them. However, due to the high pressures required of 700 bar or more, this process has to date not been able to be implemented for industrial purposes.

US 2004/0033296 A1 discloses a method in which a liquid foodstuff is subjected to high-pressure treatment using carbon dioxide in a batch or semi-batch process. Treatment is effected either at pressures of over 700 bar (10 000 psig) or at pressures of between 1.7 and 17 bar (25-250 psig); during the treatment the temperature of the mixture is maintained at a value of below 50° C., but above the solidification temperature of the foodstuff treated.

EP 0 979 657 A1 proposes conducting high-pressure treatment of orange juice with liquefied or supercritical carbon dioxide. Here, the foodstuff to be treated is mixed at a pressure of preferably from 200 to 500 bar with liquid carbon dioxide. After a certain exposure time of from 1 to 13 minutes, the mixture of juice and carbon dioxide is expanded to ambient pressure in a plurality of stages. Prior to the expansion of the mixture, an additional process step in which the mixture is subjected to intense mechanical shear forces may furthermore be provided. However, this process is quite complex in terms of construction and requires quite high operating pressures in particular for the treatment of fruit juices.

SUMMARY

The object of the invention is to specify an alternative method for the sterilization of liquid foodstuffs.

This object is achieved by a method having the features of patent claim 1.

A method for the inactivation of microorganisms in foodstuffs of the type mentioned at the outset is characterized according to the invention in that the mixture prior to or during the expansion to the second pressure value is led through a pipe and in the pipe is brought to a flow speed which suffices to generate cavitations in the liquid foodstuff.

It is essential to the invention that when passing the mixture through the pipe a flow speed is established at which cavitations arise in the liquid foodstuff, that is to say at which the static pressure within the pipe at least temporarily falls below the vapor pressure of the liquid foodstuff or of a substantial component thereof, such as for example water, at the temperature prevailing in the pipe. The flow speed arises as a function of the difference in pressure between the first and second pressure value and the geometric properties of the pipe, in particular the flow cross section, which should be selected accordingly.

The second pressure value should preferably be selected such that it is lower than the first pressure value but higher than the static pressure in the pipe during passage of the mixture. The second pressure value is in this case preferably higher than the boiling pressure of the liquid foodstuff, or of the boiling pressure at least of the component with the highest boiling pressure present in the foodstuff, at the temperature prevailing in a container connected to the pipe. This not only results in the formation in the pipe of gas bubbles of vaporized foodstuff or of a component present therein (vapor cavitation), but also in the subsequent implosion of at least a portion of the formed gas bubbles upon the renewed increase in the pressure after passage through the pipe. The accompanying shear forces resulted very efficiently in the mechanical destruction of remaining microbial cell structures. According to the invention, therefore, expansion of the pressurized mixture and mechanical treatment of the foodstuff are effected in the same operation.

The gas is present in the gaseous or in the pressure-liquefied state prior to or during formation of the mixture. Mixing is for example effected in a pressure vessel or in a stirred reactor. There are various possibilities for bringing the mixture to the first pressure value. For example, the liquid foodstuff is situated in a pressure vessel initially still at a pressure which is lower than the first pressure value, for example at ambient pressure. Subsequently, the pressurized gas is supplied to the pressure vessel until the first pressure value has become established in the pressure vessel, at least a portion of the gas mixing with the foodstuff and/or dissolving therein in the process. In another embodiment of the invention, gas and foodstuff are each first brought to an identical pressure corresponding to the first pressure value and only subsequently mixed; in this way both substances can be introduced for example into a tubular reactor. In yet another embodiment of the invention, foodstuff and gas are first mixed at a pressure value which is lower than the first pressure value and the mixture is subsequently compressed to the first pressure value. The term "mixture" here is incidentally to be understood in general terms and is intended to encompass any homogeneous mixture; in particular, a partial or complete solution of the foodstuff in the gas, or vice versa of the gas in the foodstuff, is also to be understood by this.

During and after mixing of the gas with the foodstuff, the liquefied gas diffuses into the cells of microorganisms present in the liquid foodstuff. In particular when using carbon dioxide, nitrogen oxide or another acid former as gas, this results in sterilization on account of the pH reduction alone. For this reason it is advantageous to provide for an exposure time after producing the mixture of for example 5 to 45 min before expanding the mixture. Exposure may for example be effected in a pressure vessel, or the mixture is led through a tubular reactor dimensioned such that the mixture flows through it for a period of time corresponding to the exposure time.

In a preferred embodiment of the invention, the first pressure value is selected such that the gas at this pressure value is present in the gaseous state. The gas mixes partially with the foodstuff and/or dissolves in it. If mixing is being carried out in a pressure vessel, the gas not entering into solution forms a gas phase which can be supplemented by a continuous supply of gas and thus can maintain the pressure in the pressure vessel. a. In an alternative embodiment of the method of the invention, the first pressure value is selected such that the gas at this pressure value is present at least partially in liquefied form, that is to say above the boiling pressure of the gas at the temperature prevailing during the mixing with the foodstuff. This procedure achieves intimate mixing of both liquids.

Particularly preferably, the geometric proportions of the pipe and the difference in pressure between the first and second pressure value are selected such that in the pipe a flow speed arises which is sufficiently large that the pressure falls below the boiling pressure of the liquefied gas present in the mixture and there is additionally vapor cavitation of the foodstuff to form gas bubbles (gas cavitation). Here, the second pressure value is preferably lower than the boiling pressure of the gas; the gas present in the gas bubbles thus remains in the gaseous state even after passing through the pipe and can subsequently be readily separated from the foodstuff.

As the gas intended for mixing with the liquid foodstuff, N2O, CO2, CO, He, Ar, N2, O2, or a mixture of one or more of these gases is preferably used.

The sterilization method of the invention can be effected both in a continuous process and in a batch process. In the batch process, the method of the invention is for example performed in such a way that the mixture is led from a high-pressure vessel, in which a pressure having the first pressure value prevails, via a pipe into a low-pressure vessel, in which a pressure having the second pressure value prevails. The pressures are selected and the pipe is designed such that under the effect of the pressure difference between the high- and low-pressure vessels a flow speed of the mixture within the pipe is established which is sufficiently great to result in the development of vapor and/or gas cavitation in the manner described hereinabove. A high flow speed arises as a consequence of the cross-sectional reduction in the pipe during the passage of the mixture from the high-pressure vessel into the low-pressure vessel. In this case, the mixing of foodstuff and gas and also storage of the mixture for the duration of a given exposure time (for example 5 min to 45 min) can also be effected in the high-pressure vessel. In the case where the gas is used in gaseous form, the gas in the headspace of the high-pressure vessel forms a gas phase. In order to maintain the first pressure value in the high-pressure vessel or to adjust it to given pressure values, it is expedient, during the performance of the method, that is to say during the passage of the mixture through the pipe, to continuously supply gas having the appropriate pressure into the high-pressure vessel until the liquid foodstuff has been transferred as completely as possible into the low-pressure vessel. In the case where the gas is used in pressure-liquefied form, gas and liquid foodstuff are conveyed under pressure into the high-pressure vessel by means of pumps, the first pressure value in the high-pressure vessel being able to be maintained or adjusted by the continuous supply of gas and foodstuff into the high-pressure vessel during performance of the method.

In a continuous process, it is advantageous for the mixture, after it has been produced, to pass through a tubular reactor dimensioned such that a sufficiently long exposure time (for example 5 min to 45 min) is guaranteed during which the liquefied gas can penetrate into the cells of the microorganisms.

In order to bring about particularly efficient sterilization of the liquid foodstuff, it is advantageous to perform the treatment of the foodstuff in two or more successive cycles. In this case, after passing through the pipe the mixture is recycled completely or in a substream, is brought to the first pressure value and is supplied once more to the pipe.

For example, the first pressure value is between 40 bar and 75 bar and the second pressure value is between 1 bar and 5 bar. The static pressure in the pipe during the passage of the mixture is lower than the vapor pressure of the mixture at the temperature of the mixture in the pipe. For example, the static pressure in the pipe is between 0.1 mbar and 50 mbar.

During the treatment, the temperature of the foodstuff or of the mixture for that matter should not fall below the solidification temperature of the liquid foodstuff; in particular, this temperature value should also not be undershot during the expansion. At the same time, an excessively high temperature should be avoided in order not to destroy valuable nutrients in the mixture. The minimum temperature of the foodstuff during the entire treatment is preferably between 0° C. and 50° C., preferably between 5° C. and 35° C. The pipe is preferably dimensioned such that the mixture passes through the pipe so quickly that the temperature of the mixture does not fall below the minimum temperature. As an alternative or in addition to this, the pipe may for this purpose also be heated using a heating device.

The object of the invention is also achieved by an apparatus having the features of patent claim 10.

An apparatus for the inactivation of microorganisms in foodstuffs, having a high-pressure container into which open a feed for a liquid foodstuff and a feed which is flow-connected to a source of a pressurized gas, and having means for generating cavitations in a mixture present in the high-pressure container and composed of the liquid foodstuff and the gas, is thus characterized according to the invention in that the means for generating cavitations comprise a pipe which when the apparatus is in use connects a liquid phase in the high-pressure container with a low-pressure container equipped with a gas relief valve and a withdrawal line.

The apparatus of the invention comprises a high-pressure container and a low-pressure container and also a pipe connecting them which is used specifically to generate cavitations. The term "container" should be understood in general terms here; a high-pressure or low-pressure "container" may in particular therefore in each case be a pressure vessel or a tubular reactor. Via feeds which open into the high-pressure container, the liquid foodstuff to be treated and a gas are fed in, are mixed with each other, and the interior of the high-pressure container is brought to a prescribed first pressure value. After a given exposure time of for example 5-60 min has passed, the mixture is supplied to the pipe, for example by opening a valve at a high-pressure vessel or after passing through an appropriately dimensioned tubular reactor, and is fed into the low-pressure container in which a second pressure value which is selected to be lower than the first pressure value prevails. A gas relief valve which is arranged at the low-pressure container serves to keep the pressure at this pressure value during the treatment. The pressure difference between the containers brings about a rapid flow in the pipe, which results in a drop in the static pressure in the pipe. The pipe should be dimensioned such that the speed of the flow in the pipe arising under the effect of the difference in pressure between the first pressure value and the second pressure value is sufficient for the pressure to fall below the boiling pressure of the liquid foodstuff or of a component present therein, for example water. This results in vapor cavitation within the pipe during passage of the mixture.

In an advantageous embodiment of the apparatus of the invention, in addition to the pipe, the low-pressure vessel is connected to the high-pressure vessel via a return line equipped with a compression device, for example a pump. In this apparatus arrangement, the foodstuff can be recycled into the high-pressure vessel after passing through the treatment and can be subjected to renewed treatment.

In order to prevent the liquid foodstuff or the gas from completely or partially freezing during the treatment, the pipe and/or the high-pressure container and/or the low-pressure container is/are preferably equipped with one or more heating device(s) designed for example as electric heating device(s).

BRIEF DESCRIPTION OF THE DRAWING

An exemplary embodiment of the invention shall be explained in more detail with the aid of the drawing. The sole drawing (FIG. 1) schematically shows an apparatus for performing the method of the invention.

DETAILED DESCRIPTION

The apparatus (FIG. 1) comprises two pressure vessels 2, 3, a high-pressure vessel 2 and a low-pressure vessel 3. High-pressure vessel 2 and low-pressure vessel 3 are connected to each other in terms of flow via a pipe 4 which opens out into vessels 2, 3 in each case in a lower region and which can be opened and closed by means of a valve 5. The pipe 4 can be heated by means of a heating device 6, which may for example be an electric heating device or a heat exchanger. Additional heating devices (not shown here) may also be arranged in the high-pressure vessel and/or in the low-pressure vessel.

A return line 7 constitutes a further flow connection between the high-pressure vessel 2 and the low-pressure vessel 3. The return line 7 can be isolated from the vessels 2, 3 in terms of flow by means of valves 8, 9 and is equipped with a pump 10. A withdrawal line 11 branches off from return line 7 and can be opened and closed by means of a valve 12.

A gas supply line 14 for carbon dioxide, in which are arranged a device 15 for regulating pressure and a valve 16, opens into the high-pressure vessel 2. The supply line 14 opens out into a lower region of the high-pressure vessel 2. Low-pressure vessel 3 and high-pressure vessel 2 are in addition each equipped with pressure gauges 17, 18, a relief valve 19 and also with gas discharge lines 20, 21. Furthermore, a supply line 22 opens into the high-pressure vessel 2, through which line a liquid foodstuff to be treated can be introduced into the high-pressure vessel 2. Not shown, but nevertheless present, are safety devices such as for example rupture disks or the like, which however are not of further interest for the description of the exemplary embodiment.

During operation of the apparatus 1, the high-pressure vessel 2 is first filled via the supply line 22 with the liquid to be treated, for example fruit juice, up to the height of a level 23. For example, the high-pressure vessel 2 is filled with liquid to a third to a half of its volume. Valve 22 is subsequently closed. During this, valves 5, 8 and 16 and 20 are closed.

The valve 16 is subsequently opened and a pressurized gas, for example pressurized, gaseous carbon dioxide, is charged into the high-pressure vessel 2 via gas supply line 14. A $CO_2$ distributor 24 is arranged at the end of line 14, which ensures that carbon dioxide is distributed uniformly in the liquid and hence also dissolves better. The pressure regulator 15 ensures that the pressure in the high-pressure vessel reaches a prescribed value, called the "first pressure value" here. The first pressure value is for example between 40 bar and 60 bar. During and after the supply of the gas, the gas partially mixes with the foodstuff and/or dissolves in it. A pure gas phase exists above the level 23. During the treatment, the valve 16 remains open in order to maintain the pressure in the high-pressure vessel at the first pressure value.

Within the context of the invention, it is furthermore also possible for a pressure-liquefied gas, for example pressure-liquefied carbon dioxide having a first pressure value of for example between 40 bar and 80 bar, to be fed into the high-pressure vessel 2. In this case, both liquids intimately mix with each other.

The high-pressure vessel is maintained at the first pressure value for a given exposure time of for example 1 to 60 min. A pressure, called "second pressure value" here, which is lower than the first pressure value and higher than the boiling pressure of the foodstuff, or of the component of the foodstuff having the highest boiling pressure, is maintained in the low-pressure vessel during the treatment. For example, the second pressure value is 1 bar to 3 bar. The pressure in the low-pressure vessel 3 is controlled during the performance of the method by adjustment of the relief valve 19. The gas discharged via the relief valve 19 can subsequently be collected and sent to further processing or for example compressed and resupplied to the high-pressure vessel 2. In order to preserve valuable contents in the liquid to be treated, the treatment is conducted at a moderate temperature of for example 5° C. to 35° C. During this time, the gas penetrates into the cells of microorganisms located in the liquid to be treated and ensures over-acidification of the cells.

After the exposure time has elapsed, valve 5 is opened and the mixture located in the high-pressure vessel 2 flows under the action of the pressure difference between high-pressure vessel 2 and low-pressure vessel 3 via the pipe 4 into the low-pressure vessel 3. At the same time, the large pressure difference between high-pressure vessel 2 and low-pressure vessel 3 leads to a high flow speed in the pipe 4, which in turn leads to a low static pressure in the pipe 4. The geometry of the pipe 4 is selected in such a way here that the flow speed of the mixture in the pipe 4 is sufficient to locally vaporize the liquid to be treated in the pipe 4; gas bubbles are therefore formed (vapor cavitation), which shrink again after passage through the pipe 4 and the associated increase in pressure to the pressure prevailing in the low-pressure vessel 3. If the gas is supplied to the high-pressure vessel 2 in the pressure-liquefied state, the pressure conditions can be selected such that when flowing through the pipe 4 there is simultaneously abrupt relief of pressure of the gas and hence emergence of gas cavitations. The cavitations and the implosion-like shrinking of the gas bubbles, formed in the pipe, in the liquid to be treated exert a violent mechanical action on the microbiological cells remaining in the mixture and destroy them at least to a considerable extent. In order to prevent the mixture in the pipe 4 from falling to a temperature at which the liquid to be treated freezes, the mixture should pass through the pipe 4 very rapidly. If necessary, the pipe 4 is heated by means of the heating device 6. After the pressure has fallen below a prescribed pressure value in the high-pressure vessel 2, or after complete transfer of the mixture into the low-pressure vessel 3, in the high-pressure vessel the valve 16 and subsequently the valve 5 are closed.

In the low-pressure vessel 3, the gas is separated from the treated liquid. After completion of the method, the low-pressure vessel can be completely depressurized via the gas discharge line 21. The liquid which has been treated and at least largely separated from the gas is taken off from the low-pressure vessel via the withdrawal line 11 and sent for further processing or packaging. If required, however, the treated liquid can also be fully or partly recycled into the high-pressure vessel 2 via the return line 7 by means of the pump 10 and subjected to renewed sterilization treatment.

Furthermore, instead of the high-pressure vessel 2, a tubular reactor can be provided (not shown here), through which the mixture of liquid foodstuff and gas is led at a pressure corresponding to the first pressure value and the length of which is dimensioned such that a sufficiently long exposure time of from 1 min to 60 min is enabled. In such an arrangement, a continuous supply of foodstuff and gas into the tubular reactor is possible. It is furthermore conceivable to provide an additional vessel (not shown here) which is flow-connected to the high-pressure vessel 2, in which a pressurized mixture of liquid and gas can be produced. The high-pressure vessel 2 can then be continuously supplied with the mixture to be treated from this vessel. In this case, the low-pressure vessel 3 can also be replaced by a pipe having an enlarged cross section compared to the pipe 4 and by means of which the mixture is led to downstream process steps for separation of the foodstuff from the gas and/or to further stages of the processing and/or packaging of the foodstuff.

EXAMPLE

Fruit juice, for example orange juice, is mixed with liquid carbon dioxide in a high-pressure vessel at a pressure of about 40 to 75 bar. After an exposure time of from 5 to 45 min, the mixture is passed via a capillary tube (pipe) to a low-pressure vessel in which a pressure of 1-2 bar prevails. The capillary tube has a flow cross section of between 0.5 and 2 mm2 and a length of from 30 cm to 100 cm. A heating device arranged on the capillary tube ensures that the temperature of the mixture in the capillary tube does not fall below 0° C. During expansion of the mixture within the capillary tube, gas and vapor cavitations arise which lead to intense shear forces on microorganisms still present in the mixture even after the action of the liquid carbon dioxide on the fruit juice. The combination of high-pressure treatment with carbon dioxide and mechanical treatment by cavitations results in a very effective sterilization of the fruit juice.

LIST OF REFERENCE NUMERALS 1 apparatus
2 high-pressure vessel
3 low-pressure vessel
4 pipe
5 valve
6 heating device
7 return line
8 valve
9 valve
10 pump
11 filling and withdrawal line
12 valve
13 -
14 gas supply line
15 device for regulating pressure
16 valve
17 pressure gauge
18 pressure gauge
19 relief valve
20 gas discharge line
21 gas discharge line
22 supply line
23 liquid level
24 CO2 distributor

The invention claimed is:

1. A method for the inactivation of microorganisms in foodstuffs in which a liquid foodstuff is brought into contact with and at least partially mixed with a gas such that the gas diffuses into cells of the microorganisms present in the liquid foodstuff and the resulting mixture is subsequently expanded from a first pressure value to a second pressure value, wherein the mixture prior to or during the expansion to the second pressure value is passed through a pipe and in the pipe is brought to a flow speed which suffices to generate cavitations in the gas and liquid foodstuff mixture;
   wherein the liquid foodstuff is introduced into a first vessel via a liquid foodstuff supply line which opens into the first vessel, and the gas is introduced into the first vessel via a gas supply line which opens into the first vessel; and
   wherein the gas is mixed with the liquid foodstuff in the first vessel at the first pressure value and the pipe transports the gas and liquid foodstuff mixture to a second vessel at the second pressure value.

2. The method as claimed in claim 1, wherein the gas at the first pressure value is present in gaseous form or at least partially in pressure-liquefied form.

3. The method as claimed in claim 1, wherein at least a portion of the gas at the first pressure value is present in a pressure-liquefied form and the mixture in the pipe is brought to a flow speed which suffices to vaporize the pressure-liquefied portion of the gas.

4. The method as claimed in claim 1, wherein the gas used is N2O, CO2, CO, He, Ar, N2, O2, or a mixture of one or more of these gases.

5. The method as claimed in claim 1, wherein the liquid foodstuff is treated in a continuous process or in a batch process.

6. The method as claimed in claim 1, wherein the liquid foodstuff is treated in a plurality of cycles.

7. The method as claimed in claim 1, wherein the first pressure value is of a value of between 35 and 80 bar.

8. The method as claimed in claim 1, wherein the second pressure value is of a value of between 1 and 5 bar.

9. The method as claimed in claim 1, wherein the gas and liquid foodstuff mixture is heated during the expansion and is maintained at a temperature value of between 0° C. and 40° C.

10. The method of claim 1, wherein the first pressure value is maintained in the first vessel by continuously supplying the gas to the liquid foodstuff in the first vessel through a distributor within the first vessel.

11. The method of claim 1, further comprising separating the gas from the liquid foodstuff in the second vessel.

12. The method of claim 1, wherein mixing the gas with the liquid foodstuff comprises storing the gas and liquid foodstuff mixture in the first vessel for a predetermined exposure time.

13. A method for inactivating microorganisms in liquid foodstuff comprising:
   introducing the liquid foodstuff into a first vessel via a liquid foodstuff supply line which opens into the first vessel, and introducing a gas into the first vessel via a gas supply line which opens into the first vessel;
   mixing the gas with the liquid foodstuff in the first vessel at a first pressure value;
   transporting the gas and liquid foodstuff mixture from the first vessel to a second vessel through a pipe at a flow speed sufficient to cause cavitation in the gas and liquid foodstuff mixture;
   expanding the gas and liquid foodstuff mixture from the first pressure value to a second pressure value in the second vessel, the liquid foodstuff in the gas and liquid foodstuff mixture now being processed liquid foodstuff; and
   separating the gas from the processed liquid foodstuff in the second vessel.

14. The method of claim 13, further comprising a step of returning the processed liquid foodstuff from the second vessel to the first vessel through a return line; and
   with the processed liquid foodstuff, repeating the steps of mixing the gas with the liquid foodstuff, transporting the gas and liquid foodstuff mixture, expanding the gas and liquid foodstuff mixture, and separating the gas from the processed liquid foodstuff.

15. The method of claim 13, further comprising heating the gas and liquid foodstuff mixture with a heater as the gas and liquid foodstuff mixture flows through the pipe.

16. The method of claim 13, wherein the differential pressure between the first vessel and the second vessel causes the gas and liquid foodstuff mixture to flow through the pipe at the flow speed sufficient to cause cavitation.

17. The method of claim 13, wherein the step of mixing the gas with the liquid foodstuff comprises:
   mixing the gas into the liquid foodstuff through a distributor at an end of the gas supply line within the first vessel; and
   diffusing the gas into cells of the microorganisms in the liquid foodstuff to sterilize the cells of the microorganisms.

18. The method of claim 13, wherein mixing the gas with the liquid foodstuff comprises storing the gas and liquid foodstuff mixture in the first vessel for a predetermined exposure time.

19. The method of claim 13, wherein the gas is introduced into the first vessel to pressurize the first vessel to the first pressure value after the liquid foodstuff has been introduced into the first vessel.

* * * * *